Patented Apr. 18, 1950

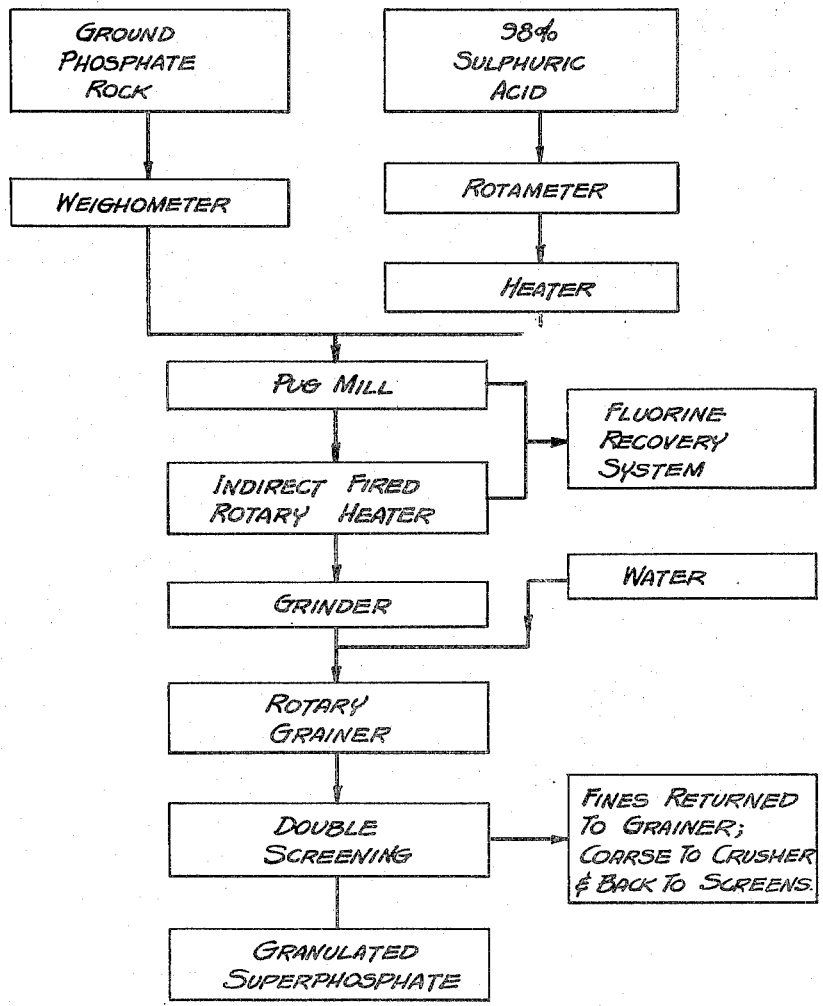

2,504,546

UNITED STATES PATENT OFFICE 2,504,546

SUPERPHOSPHATE MANUFACTURE

Edward H. Wight, Baltimore, and Thomas O. Tongue, Curtis Bay, Md., assignors to The Davison Chemical Corporation, Baltimore, Md.

Application January 28, 1947, Serial No. 724,728

3 Claims. (Cl. 71—40)

This invention relates to superphosphate and the manufacture thereof and more particularly has reference to superphosphate having a low content of fluorine.

In the current usual method of manufacturing superphosphate by mixing dry, ground phosphate rock and sulphuric acid, approximately 25% of the fluorine contained in the rock is driven off. There is, however, sufficient active fluorine retained in the rock so that the resultant superphosphate will have a fluorine content high enough to cause marked deterioration of bags in which it is packed for handling and shipment.

An object of this invention is to provide a superphosphate which has a low fluorine content and a method of preparing the same in which a large fraction of the fluorine in the phosphate rock is driven off during the manufacturing procedure.

Another object of this invention is to provide a method of manufacturing superphosphate which has substantially no tendency to rot bags in which it is packed.

A further object of the present invention is to provide a method of manufacturing a granulated superphosphate without resorting to a drying operation.

Other objects of this invention will appear more fully hereinafter in the description of methods of carrying out the invention.

In order to facilitate an understanding of the present invention, reference is made to the accompanying drawing in which:

The single figure is a diagrammatic representation of a flow sheet illustrating the several steps of the process of the present invention.

Up to the present time, superphosphate has been manufactured by mixing ground phosphate rock with an aqueous sulphuric acid solution of a strength of from about 53–56° Bé. (66.6 to 71% $H_2SO_4$). The mixture is made from about 1200 parts by weight of ground phosphate rock and about 1000 parts by weight of 56° Bé. sulphuric acid, but the proportions may vary somewhat depending upon the composition of the phosphate rock. The superphosphate produced as a result will generally show a conversion to ammonium citrate soluble $P_2O_5$ of approximately 95–98% of the total $P_2O_5$ within a period of about two weeks. During the mixing of the acid with the phosphate rock about 25% of the fluorine contained in the phosphate rock is driven off as hereinbefore mentioned.

In accordance with the present invention, it has been discovered that by mixing the dry, ground phosphate rock with sulphuric acid containing about 98% $H_2SO_4$, it is possible to volatilize from 55–75% of the fluorine contained in the phosphate rock and at the same time produce a cured superphosphate that does not have the property of producing bag rot.

While the use of 98% sulphuric acid, as the acidulating agent for the dry, ground phosphate rock instead of the usual weaker acid, will effect the elimination of a large quantity of the fluorine from the phosphate rock, the superphosphate product is not satisfactory because the conversion of the $P_2O_5$ content to the ammonium citrate soluble form is only about 75%. Furthermore, the physical condition of the resulting mixture is unsatisfactory because it is a sticky hygroscopic mass. In accordance with the present invention, it has been discovered that by adding a reasonable amount of water to the mixture of phosphate rock and 98% sulphuric acid after the mixture has been effected, the conversion of the $P_2O_5$ content to the ammonium citrate soluble form becomes fully equivalent to that obtained by mixing the usual weaker sulphuric acid with the phosphate rock as normally employed in the manufacture of superphosphate. By adding water to the mixture of ground phosphate rock and 98% sulphuric acid, the resulting superphosphate has a physical condition which is fully equal to the standard superphosphate. More important than this, however, is the fact that the bag rotting property of the standard superphosphate has been eliminated.

There are, of course, definite advantages in driving off a large amount of fluorine from the phosphate rock not only from the standpoint of getting rid of the material that is undesirable in the superphosphate product, but also to recover the fluorine in useful and saleable form, such as for instance, fluosilicates, fluoborates or fluorides.

In the preferred form of the present invention, the mixture of 98% sulphuric acid and ground phosphate rock is heated or calcined at a low temperature prior to addition of water. The heating or calcining of the mixture of strong acid and ground phosphate rock serves to increase the evolution of fluorine from the mixture. It has been found that without the heating step, the fluorine elimination is about 55%, whereas with the heating step, the evolution of fluorine from the mixture increases up to from 65–75%.

In carrying out the present invention, a phosphate rock was employed which had the following analysis:

| | Per cent |
|---|---|
| Moisture | 0.70 |
| Total $P_2O_5$ | 33.72 |
| $CO_2$ | 2.19 |
| Fluorine | 3.65 |

In order to illustrate the results of the present invention and the comparative advantages of variations in the process, several examples of acidulating ground phosphate rock with strong sulphuric acid will appear hereinafter. In these examples, the sulphuric acid was heated to about 130° F. before mixing with the dry, ground phosphate rock.

*Example I*

120 parts by weight of ground phosphate rock and 71.3 parts by weight of 98% sulphuric acid were mixed together and gave a product that was damp and sticky. In two days, it analyzed:

| | Per cent |
|---|---|
| Moisture | 1.99 |
| Total $P_2O_5$ | 21.60 |
| Insoluble $P_2O_5$ | 5.32 |
| Available $P_2O_5$ | 16.28 |
| $P_2O_5$ conversion | 75.40 |
| Fluorine | 1.01 |
| F Evolution | 56.9 |

In two weeks the mixture was not improved, it was in the same physical condition, i. e., a product entirely unsuitable as a commercial fertilizer. The analysis at that time was as follows:

| | Per cent |
|---|---|
| Moisture | 1.60 |
| Total $P_2O_5$ | 21.80 |
| Insoluble $P_2O_5$ | 5.32 |
| Available $P_2O_5$ | 16.48 |
| $P_2O_5$ conversion | 75.50 |
| Fluorine | 1.01 |
| F Evolution | 57.20 |

From the above it will be seen that although the fluorine evolution is rather attractive, the physical condition and the analysis are such that the product is of little value from a commercial standpoint.

*Example II*

The following example is one where water is added to the mixture after it has been made of the identical proportions of phosphate rock and 98% sulphuric acid as in Example I. About ten minutes after the mixing was completed, 18 parts by weight of water were added and the analysis of this material in two days was:

| | Per cent |
|---|---|
| Moisture | 3.92 |
| Total $P_2O_5$ | 21.40 |
| Insoluble $P_2O_5$ | 1.32 |
| Available $P_2O_5$ | 20.08 |
| $P_2O_5$ conversion | 93.80 |
| Fluorine | 1.05 |
| F Evolution | 54.50 |

After two weeks, the same mixture gave the following analysis:

| | Per cent |
|---|---|
| Moisture | 0.82 |
| Total $P_2O_5$ | 21.50 |
| Insoluble $P_2O_5$ | 0.72 |
| Available $P_2O_5$ | 20.78 |
| $P_2O_5$ conversion | 96.70 |
| Fluorine | 0.93 |
| F Evolution | 60.10 |

From the above two analyses, it will be seen that the conversion of $P_2O_5$ to ammonium citrate soluble form is very satisfactory. Moreover, the physical condition of the resulting material is very good.

It will be noted that the moisture content changed from 3.92 to 0.82 in about two weeks, although the total $P_2O_5$ remained substantially constant. This seems rather incongruous but for the fact that it is known that superphosphate will take up and bind water either as crystal water or hydrate water during the curing period. This water, which for convenience sake might be called "chemically bound water," does not show up as moisture during the chemical analysis.

*Example III*

This is the preferred method of operation. The mixture of 98% acid and phosphate rock is heated prior to the addition of water. The same proportion of ground phosphate rock and 98% sulphuric acid which were used in Examples I and II, was also used in this case. After the mixing operation, the resulting product was heated at a temperature of between 320 and 340° F. for a period of about one hour. The material was then ground and 14 parts by weight of water were added. The analysis of the product after two days was:

| | Per cent |
|---|---|
| Moisture | 3.16 |
| Total $P_2O_5$ | 21.40 |
| Insoluble $P_2O_5$ | 1.84 |
| Available $P_2O_5$ | 19.56 |
| $P_2O_5$ conversion | 91.40 |
| Fluorine | 0.85 |
| F Evolution | 63.40 |

The product was cured for two weeks at about 140° F. because this temperature of about 140° represents the temperature present in very large piles of superphosphate coming from a hot process. The resulting analysis in two weeks was:

| | Per cent |
|---|---|
| Moisture | 0.98 |
| Total $P_2O_5$ | 22.00 |
| Insoluble $P_2O_5$ | 1.68 |
| Available $P_2O_5$ | 20.32 |
| $P_2O_5$ conversion | 92.40 |
| Fluorine | 0.56 |
| F Evolution | 76.30 |

In carrying out the present invention on a large scale, it is preferable to follow a procedure as illustrated in the flow sheet of the drawing. As indicated, dry, ground phosphate rock, of the composition hereinbefore indicated or of varying compositions, is continuously fed through a weighometer to the hopper of a pug mill.

Simultaneously, sulphuric acid containing about 98% $H_2SO_4$ is fed through a rotameter and through a heater, in which the acid is heated to a temperature of about 130° F., to the hopper of the pug mill. The weighometer and rotameter serve to proportion the acid and phosphate rock as desired.

Mixing of the acid and phosphate rock is effected in the pug mill and during the mixing about 55% of the fluorine content is evolved. After the mixing has been completed, the mixture is passed through a rotary heater, preferably indirectly fired, in which its temperature is raised to the range of 250–500° F., or more specifically to 320–340° F. The temperature is maintained for a period of about one hour. During the heating, additional fluorine is driven off from the mixture and this fluorine, together with that evolved in the pug mill, is sent to a fluorine recovery system. In the heat treatment, about 10 to 20% additional fluorine is driven off.

The thus treated mixture of acid and phosphate rock is then ground and the ground material fed to a rotary grainer wherein water is added in proportions sufficient to effect the desired conversion of the $P_2O_5$ content of the mixture to the citrate soluble form. The quantity of water added to the ground mixture is also such as will combine with the ground mixture to form a granular product. In lieu of water, condensing steam may be used in this wetting operation.

By controlling the amount of water added to the ground mixture, the granular product is fairly dry and does not require a separate drying step as was the case in many of the heretofore employed procedures for producing granular superphosphate.

The granular material discharged from the rotary grainer is subjected to a double screening to obtain a product of optimum size which may be bagged and sold as commercial granulated superphosphate. Fines separated by the double screening operation are returned to the grainer for retreatment, whereas the coarse particles are crushed and then recirculated through the screens.

While the process may be carried out continuously, it may equally be carried out in a batch or intermittent manner.

At the present time granulated superphosphate is made in very large tonnages by granulating den superphosphate. This involves a graining operation and a drying operation. When fresh superphosphate is used immediately from the den, the moisture elimination in the dryer is approximately 5%. In the process of this invention, water is added instead of removed and thus the cost of fuel in this step is eliminated. This process is, of course, not limited to granulated superphosphate, as the wetting operation can be carried out on a belt or other suitable means, so that substantially no graining takes place.

In the foregoing examples, sulphuric acid of 98% has been used. The reason for this is that 98% sulphuric acid is the most economical to use but a somewhat weaker acid can be used. When a weaker acid, such as 60° or 66° Bé. is used, it means that in the heating operation a certain amount of water will have to be volatilized and this will, of course, increase the cost of the process. Beyond this, the attractive features of the process, i. e., fluorine and bag rot elimination, remain.

While in Example III reference has been made to heating the mixture to a temperature ranging from about 320° to 340° F., favorable results can also be obtained by heating to temperatures ranging from about 250° to 500° F.

The effect of superphosphate on paper bags, which are now generally used as containers, may be determined in the laboratory by placing samples of the paper over a crystallizing dish containing superphosphate. This is covered with a glass plate and a small weight is put on top to hold the paper in place. After exposure for two weeks, the sample is removed and its strength is determined with a regular Mullen paper tester. The paper which was placed over ordinary superphosphate, in this manner, will show a strength of only about one-third of the original strength. Paper which was placed over superphosphate made according to Example I shows about ⅘ of the original strength and the corresponding figure for paper exposed to superphosphate made according to Example II is about one-half.

Superphosphate made according to Example III, however, which is the preferred method, has very little, if any, action on the paper because paper exposed to such superphosphate showed a strength fully equivalent to the original paper. This is a very important contribution to the art because bag rot has been and is one of the major problems of the superphosphate manufacturer as well as the farmer.

From the foregoing, it will be appreciated that the present invention provides a superphosphate of low fluorine content and a method of making the same. As a result of the low fluorine content, the product may be packaged in paper bags without the difficulties due to bag rot as incurred in the packaging of superphosphate up to the present time.

We claim:

1. A process for the manufacture of a superphosphate fertilizer having a low fluorine concentration from phosphate rock comprising mixing finely divided phosphate rock with about 98% sulphuric acid in acid to rock ratios of about the stoichiometric ratio in which sulphuric acid reacts with the acid reactible compounds in the rock and with the calcium phosphate in the rock to form mono-calcium phosphate, heating the reaction mixture to a temperature of about 250° F. to 500° F. for about one hour, said mixing and heating steps volatilizing about 60% to 75% of the fluorine originally present in the phosphate rock, grinding the heated product, adding water thereto in quantities sufficient to substantially complete the reaction between the sulphuric acid and phosphate rock to effect conversion of the phosphate to the citrate soluble form, and graining the mixture as the water is added to the heated reaction product.

2. A process for the manufacture of a superphosphate fertilizer having a low fluorine concentration from phosphate rock comprising mixing finely divided phosphate rock with about 98% sulphuric acid heated to about 100° F. to 200° F. in acid to rock ratios of about the stoichiometric ratio in which sulphuric acid reacts with the acid reactible compounds in the rock and with the calcium phosphate in the rock to form mono-calcium phosphate, heating the reaction mixture to a temperature of about 250° F. to 500° F. for about one hour, said mixing and heating steps volatilizing about 60% to 75% of the fluorine originally present in the phosphate rock, grinding the heated product, adding water thereto in quantities sufficient to substantially complete the reaction between the sulphuric acid and phosphate rock to effect conversion of the phosphate to the citrate soluble form, and graining the mixture as the water is added to the heated reaction product.

3. A process for the manufacture of a superphosphate fertilizer having a low fluorine concentration from phosphate rock comprising mixing finely divided phosphate rock with about 98% sulphuric acid in acid to rock ratios of about the stoichiometric ratio in which sulphuric acid reacts with acid reactible compounds in the rock and with the calcium phosphate in the rock to form mono-calcium phosphate, heating the reaction mixture to a temperature of about 320° F. to 340° F. for about one hour, said mixing and heating steps volatilizing about 60% to 75% of the fluorine originally present in the phosphate rock, grinding the heated product, adding water thereto in quantities sufficient to substantially complete the reaction between the sulphuric acid and phosphate rock to effect conversion of the phosphate to the citrate soluble form, and graining the mixture as the water is added to the heated reaction product.

EDWARD H. WIGHT.
THOMAS O. TONGUE.

REFERENCES CITED

The following references are of record in the file of this patent:

UNITED STATES PATENTS

| Number | Name | Date |
|---|---|---|
| 1,485,406 | Meyers | Mar. 4, 1924 |
| 1,637,428 | Rupp | Aug. 2, 1928 |
| 1,712,404 | Rupp | Mar. 7, 1929 |
| 1,851,179 | Hechenbleikner | Mar. 29, 1932 |
| 1,972,196 | Larison | Sept. 4, 1934 |
| 2,248,514 | Shoeld | July 8, 1941 |
| 2,338,407 | Coleman | Jan. 4, 1944 |

FOREIGN PATENTS

| Number | Country | Date |
|---|---|---|
| 165,759 | Great Britain | Nov. 21, 1921 |
| 295,848 | Great Britain | Aug. 23, 1928 |
| 300,965 | Great Britain | Feb. 17, 1930 |